United States Patent

[11] 3,588,722

[72] Inventor Robert Lehn Hoelscher
San Diego, Calif.

[21] Appl. No. 795,583
[22] Filed Jan. 31, 1969
[45] Patented June 28, 1971
[73] Assignee Eastman Kodak Company
Rochester, N.Y.

[54] PEAK DETECTOR
2 Claims, 1 Drawing Fig.

[52] U.S. Cl. .......... 319/204, 307/235, 329/192
[51] Int. Cl. .......... H03d 1/10
[50] Field of Search .......... 329/192, 166, 204, 205; 325/480, 482; 307/235; 330/9; 318/34

[56] References Cited

UNITED STATES PATENTS 3,106,684 10/1963 Luik .......... 330/9X
3,130,325 4/1964 Rubin et al. .......... 330/9X
3,137,822 6/1964 Anderson .......... 329/204
3,264,569 8/1966 Lefferts .......... 330/9
3,398,373 8/1968 Caswell .......... 307/235X

OTHER REFERENCES

Bidwell et al. " Peak Detector & Average Detector" Sept. 1966 IBM Technical Disclosure Bulletin, Vol. 9, No. 4 p. 426- – 428 307-235

*Primary Examiner*—Alfred L. Brody
*Attorneys*—R. W. Hampton and Daniel E. Sragow

ABSTRACT: A peak detector network consists of a capacitor and a diode array. The signal to be detected is passed through the capacitor and is then shorted to ground through the diode array. The diode array will tend to short out the signal except when the input signal tends to change the direction of charge of the capacitor. At the time of the charge the polarity across the diodes will change therefore giving an output signal.

Circuitry is also provided which enables the peak detector to handle signals having a wide range of amplitudes. Further circuitry is provided to give uniform rectangular wave output regardless of the height or polarity of the input. Also provided is a trigger arrangement which disables the output circuitry for any signal which falls below a given level.

Patented June 28, 1971 3,588,722
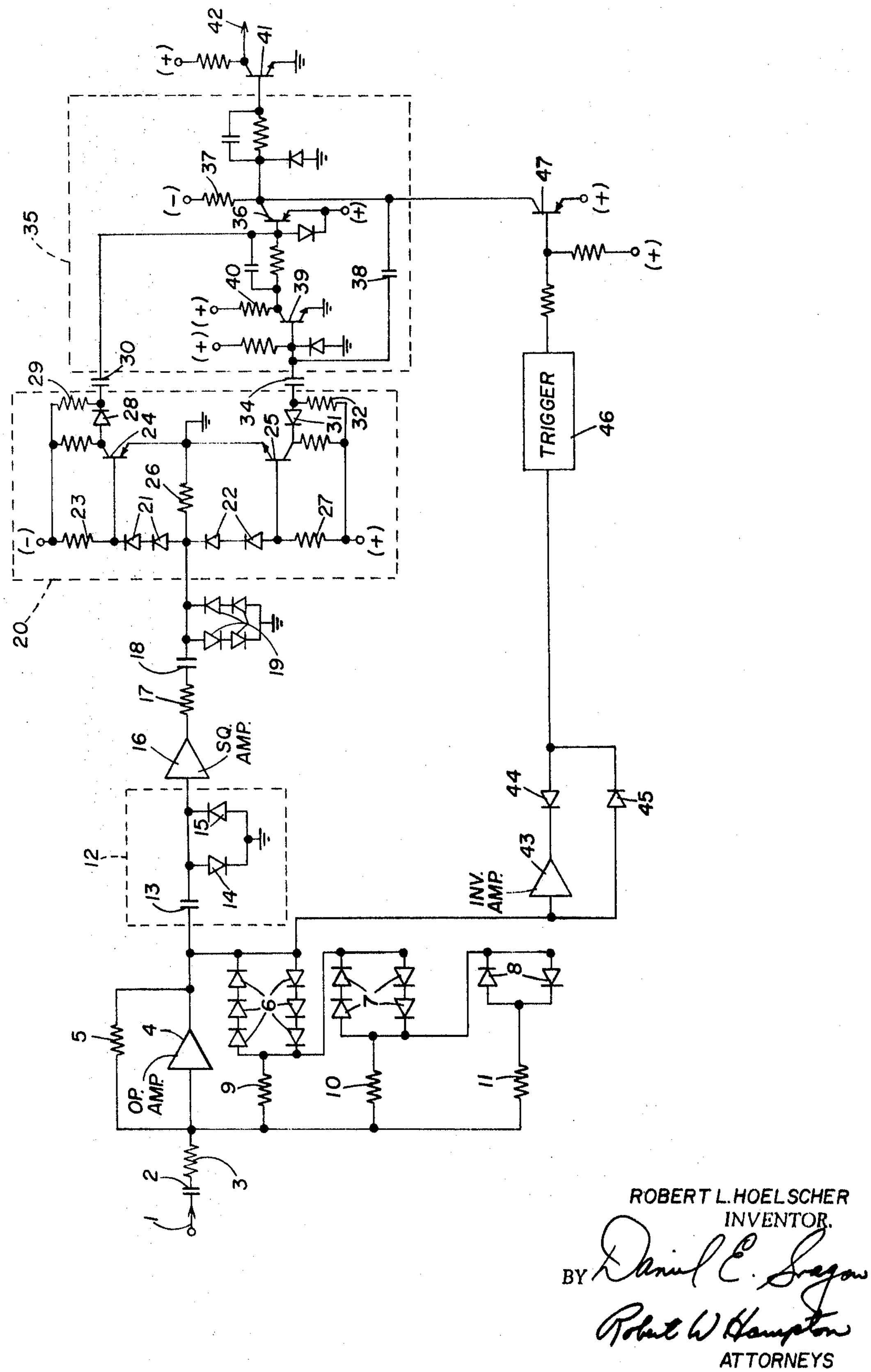
ROBERT L. HOELSCHER
INVENTOR.
BY Daniel E. Sragow
Robert W. Hampton
ATTORNEYS

PEAK DETECTOR

BACKGROUND OF THE INVENTION

1. Field of the Invention

This invention relates to processing of digital data signals and more particularly to the separation of binary signals from background noise.

2. Description of the Prior Art

When digital data is recorded on magnetic tape at high speed and with high packing density, the noise level tends to be high. Sophisticated circuitry is needed to separate the noise from the intelligence so that the information obtained is accurate. It is well known to separate the intelligence from the noise in above-described situations by detecting the signal peaks and to square them so as to give a true binary output. The prior-art peak detectors have been complicated, however, and have had to be tuned to a particular digital data frequency and packing density. Whenever the type of input was to be changed, the peak detector had to be retuned. Furthermore, the prior-art peak detectors occasionally treated a burst of noise as an intelligence pulse which gave a faulty bit of information.

SUMMARY OF THE INVENTION

It is therefore an object of the invention to provide a peak detector which is simple and has high accuracy.

It is a further object of the invention to provide a peak detector which can accommodate a great variety of input signals without readjustment.

It is an additional object of the invention to provide a peak detector with a built-in gating arrangement so that the detector will give no output unless there is an intelligence input.

It is a further object of the invention to provide the output of a peak detector with a monostable multivibrator which can be triggered either by a positive or a negative pulse.

The above and other objects of the invention are attained in a preferred embodiment of the invention by providing a peak detector which includes a capacitor and a diode network. The capacitor and the diode network are connected so that a signal can pass only when the rate of change of the input reverses. At the input to the capacitor-diode network is an amplifier with non-linear feedback. As the signal increases the feedback increases so as to maintain high amplification at low levels without overpowering the amplifier at high input levels. The output of the capacitor-diode network is fed through a squaring amplifier to a monostable multivibrator which can be triggered by either a positive or negative pulse so as to further add to the versatility of the system. A trigger system is also provided which disables the output of the monostable multivibrator unless a signal of the proper amplitude is detected. The trigger is arranged so that input signals of either positive or negative polarity will cause operation of the system.

BRIEF DESCRIPTION OF THE DRAWING

The invention will be better understood from the following description when read with the drawing in which:

The sole FIG. is a schematic diagram of a circuit according to the invention.

DESCRIPTION OF THE PREFERRED EMBODIMENT

The signal whose peaks are to be detected comes into the peak detector through input terminal 1. The signal is fed through coupling capacitor 2 and input summing resistor 3 to operational amplifier 4. Operational amplifier 4 is bridged by four feedback paths. Resistance 5 determines the gain of the system at very low signal amplitudes since diode sets 6, 7, and 8 prevent feedback through resistors 9, 10, and 11, respectively. When the output of operational amplifier 4 goes above the voltage drop of three diodes, diode set 6 conducts which therefore places resistance 9 in parallel with resistance 5 which therefore increases the feedback around operational amplifier 4. When the output signal of operational amplifier 4 increases still further to the voltage drop of five diodes, diode set 7 then conducts. Thus resistance 10 in parallel with resistances 9 and 5 which again further increases the feedback path around operational amplifier 4. Finally, when the output of operational amplifier 4 exceeds the voltage drop of six diodes, diode set 8 conducts thus placing resistance 11 in parallel with resistances 5, 10, and 11 which gives the greatest amount of feedback. It can therefore be seen that the portion of the circuit thus far described has sufficient gain for low signals but less than unity gain for higher level signals, which permits the utilization of inputs of various amplitudes.

The amplified signal is subsequently fed to the peak detector 12. Peak detector 12 is comprised of capacitor 13 and diodes 14 and 15. A positive going signal, for instance, will cause an initial positive rise at the output of the peak detector 12 and then will cause no further signal change until the direction of the signal changes. At this point, the output of the peak detector 12 will go through zero. As the output goes toward zero, diode 14 stops conducting, and the output continues through zero to the conduction potential of diode 15. It is at this point that an output signal is obtained.

The output signal of peak detector 12 is fed to squaring amplifier 16 which changes the low amplitude rectangular wave coming from the peak detector 12 to a large amplitude rectangular wave with very steep leading and trailing edges and simultaneously eliminates the noise signal. The rectangular wave is then fed through resistor 17 and capacitor 18 to the DC restoring network 19, which establishes a DC voltage level of the drop across the two diodes, and thence to the logic network 20. A positive rectangular pulse goes through diodes 21 to the base of PNP transistor 24. A negative rectangular pulse goes through diodes 22 to the base of NPN transistor 25. A positive pulse therefore turns off transistor 24 whereas a negative pulse turns off transistor 25. Since transistors 24 and 25 are both normally conducting, the cathode of diode 28 holds the common point between resistor 29 and capacitor 30 to ground, and the anode of diode 31 holds the common point between resistor 32 an capacitor 34 to ground. If transistor 24 is turned off, capacitor 30 will slowly be charged, through resistor 29, to the potential of the terminal labeled (−). When the input signal changes direction at its peak, the rectangular wave at capacitor 18 goes negative, and transistor 24 turns on, providing a sharp positive pulse to the base of transistor 36. In the opposite polarity, transistor 25, capacitor 34, resistor 32, and diode 31 provide a sharp negative pulse to the base of transistor 39.

Monostable multivibrator 35 may be switched to its unstable state by either a positive or negative pulse. A positive pulse combing through capacitor 30 raises the voltage on the base of PNP transistor 36 which turns it off. The voltage drop across resistor 37 therefore decreases. This decrease in voltage is coupled through capacitor 38 to the base of NPN transistor 39 which turns it off. However, as capacitor 38 charges, the voltage on the base of transistor 39 rises thus turning it on. When transistor 39 is on, the voltage drop across resistor 40 causes the base of transistor 36 to be low enough so that it is again turned on. Feedback through capacitor 38 causes rapid switching.

Conversely, when a negative pulse passes through diode 31 and capacitor 34, transistor 39 is turned off which in turn turns off transistor 36. Again capacitor 38 serves as a feedback path to keep transistor 39 off until capacitor 38 has charged. The output of monostable multivibrator 35 is fed to output transistor 41 which acts merely as an output amplifier to feed the output signal to terminal 42.

In order to make the peak detector more immune to noise and other spurious signals, a trigger arrangement is provided which switches off monostable multivibrator 35 unless there is an input signal of the proper amplitude. The output of operational amplifier 4 is fed to the unity gain inverting amplifier 43 and then to diode 44. Paralleling inverting amplifier 43 and diode 44 is diode 45. At a result of this arrangement either a positive or a negative pulse at the input of inverting amplifier 43 will result in a positive pulse at the input of trigger 46.

Trigger 46 may be any one of a number of well-known triggers such as a Schmitt trigger which switches when its input reaches a certain voltage. Trigger 46 produces a positive step which turns off PNP transistor 47 which permits the collector of transistor 36 to become negative.

It can therefore be seen that input signals over a very great range can be used to provide digital signals having a narrow range with great accuracy.

The invention has been described in detail with particular reference to a preferred embodiment thereof, but it will be understood that variations and modifications can be effected within the spirit and scope of the invention.

I claim:

1. Apparatus for detecting peaks of a cyclically varying input signal, said apparatus comprising:
 capacitance means coupled to receive and store the input signal;
 first unidirectional conducting means coupled to said capacitance means for facilitating the current flow to said capacitance means in a first direction and the charging of said capacitance means; second unidirectional conducting means coupled to said capacitance means for facilitating the current flow to said capacitance means in a second direction opposite to the first direction and the discharging of said capacitance means;
 means coupled to said first and second unidirectional conducting means for providing an output signal indicative of the peak of the input signal; and
 amplifier means coupled to receive the input signal for variably amplifying the input signal dependent upon the amplitude of the input signal and for applying the amplified input signal to said capacitance means, said amplifier means comprising an operational amplifier having a first feedback path including first and second diode means connected in parallel with each other so as to be conductive in opposite directions, an impedance element, said first and second diode means each having a forward conducting impedance of a first magnitude; and a second feedback path connected in parallel with said first impedance element and including third and fourth diode means connected in parallel with each other so as to be conductive in opposite directions, and a second impedance element, said third and fourth diode means each having a forward conducting impedance of a second magnitude greater than the first magnitude.

2. Apparatus for detecting peaks of a cyclically varying input signal, said apparatus comprising: capacitance means coupled to receive and store the input signal;
 first unidirectional conducting means coupled to said capacitance means for facilitating the current flow to said capacitance means in a first direction and the charging of said capacitance means;
 second unidirectional conducting means coupled to said capacitance means for facilitating the current flow to said capacitance means in a second direction opposite to the first direction and the discharging of said capacitance means;
 means coupled to said first and second unidirectional conducting means for providing an output signal indicative of the peaks of the input signal; and
 switch means coupled to receive said input signal and operative in a first state to apply the output signal to an output terminal in response to those input signals having an amplitude not less than a predetermined level and operative in a second state to disassociate the output signal from said output terminal in response to those input signals having an amplitude less than the predetermined level.